(No Model.) 5 Sheets—Sheet 1.
W. M. SCHLESINGER.
TRAVELING CURRENT COLLECTOR FOR ELECTRIC RAILWAY MOTOR CARS.
No. 377,215. Patented Jan. 31, 1888.

WITNESSES: INVENTOR
M. F. Hallick Wm. M. Schlesinger
W. H. Brotty By J. VanStavoren
ATTORNEY (No Model.)  5 Sheets—Sheet 2.

W. M. SCHLESINGER.
TRAVELING CURRENT COLLECTOR FOR ELECTRIC RAILWAY MOTOR CARS.

No. 377,215.  Patented Jan. 31, 1888.

WITNESSES:

INVENTOR
Wm. M. Schlesinger
ATTORNEY (No Model.) 5 Sheets—Sheet 3.
W. M. SCHLESINGER.
TRAVELING CURRENT COLLECTOR FOR ELECTRIC RAILWAY MOTOR CARS.
No. 377,215. Patented Jan. 31, 1888.

WITNESSES:
M. F. Halleck
W. H. Brody INVENTOR
Wm. M. Schlesinger
By J. J. Van Stavoren
ATTORNEY (No Model.) 5 Sheets—Sheet 4.

W. M. SCHLESINGER.
TRAVELING CURRENT COLLECTOR FOR ELECTRIC RAILWAY MOTOR CARS.

No. 377,215. Patented Jan. 31, 1888.

WITNESSES:
M. F. Halleck
W. H. Bragg

INVENTOR
Wm. M. Schlesinger
By S. J. Van Stavoren
ATTORNEY (No Model.) 5 Sheets—Sheet 5.

W. M. SCHLESINGER.
TRAVELING CURRENT COLLECTOR FOR ELECTRIC RAILWAY MOTOR CARS.

No. 377,215. Patented Jan. 31, 1888.

WITNESSES:
Wm H. Van Horn
John Rodgers

INVENTOR,
Wm. M. Schlesinger
By S. J. Van Stavoren
ATTORNEY

UNITED STATES PATENT OFFICE.

WILLIAM M. SCHLESINGER, OF PHILADELPHIA, PENNSYLVANIA.

TRAVELING CURRENT-COLLECTOR FOR ELECTRIC-RAILWAY MOTOR-CARS.

SPECIFICATION forming part of Letters Patent No. 377,215, dated January 31, 1888.

Application filed October 21, 1886. Serial No. 216,842. (No model.)

*To all whom it may concern:*

Be it known that I, WILLIAM M. SCHLESINGER, a citizen of the United States, residing at Philadelphia, in the county of Philadelphia and State of Pennsylvania, have invented certain new and useful Improvements in Traveling Current-Collectors for Electric-Railway Motor-Cars, of which the following is a specification, reference being had therein to the accompanying drawings, wherein—

Fig. 3 is an elevation similar to Fig. 1, showing collector and an arrangement of operating mechanism suitable for two more collector-frames for a car.

My invention has relation to current-collectors attached to and traveling with electric-motor cars in a system of electric railways having electric conductors arranged within slotted conduits; and it has for its object, first, to maintain under varying conditions of service a good electrical connection between the collector-brushes and the conductors in the conduit; second, to so attach the collector to the car and provide it with actuating devices that the collector and its brushes are moved or actuated to admit of the car running forward or backward without liability of breaking or impairing the collector-brushes; third, to so construct the collector and mount or hang it upon the car that the electric conductors in the conduit are protected from damage due to excessive contact-pressure between the collector-brushes and conductors; fourth, to provide good protection or insulation for the collector-conductors connecting the brushes with the electromotor on the motor-car; fifth, to provide the collector with a slot-iron in advance of the brush iron or frame, which advanced slot-iron is employed to push aside stones or obstructions in the line of the collector, and thus protect it and the conductors attached thereto from damage or impairment; sixth, to provide a collector the contact of the brushes of which with the conduit-conductors is not affected by the vertical and lateral vibrations or oscillations of the car nor by the lateral inequalities or curves in the conduit-slot; seventh, to a collector-frame which is independent of or is adjustable to the varying height of the body of the car from the conduit and yields to variation of such height due to variation in the load on the car or to the unevenness of the road-bed or of the conduit, and eighth, to collector contact-brushes which have an angular spring-pressure in the direction of their line of travel or movement along the conductors, whereby a continuous contact between the brushes and conductors is maintained under varying conditions of service and under a forward or backward movement or travel of the car.

My invention accordingly consists of a collector comprising, essentially, a frame which is adapted to enter and travel in a conduit-slot, a pair of parallel contact-brushes secured to said frame in line with the conduit-conductors, electrical conductors leading from said brushes and suitably incased in said frame, a support or frame having a lateral movement, and upon which the collector-frame is loosely mounted so as to have an independent vertical and lateral movement, whereby the collector and its supporting-frame are independent of the oscillations of the car, the height of the car-body from the conduit, and are adapted to be moved to adjust the contact-brushes to permit the car to travel either forwardly or backwardly without danger of damaging or breaking the collector-brushes.

My invention further consists of the combination, construction, and arrangement of parts, as hereinafter described and claimed, having reference particularly to a collector pivoted or loosely journaled to a frame which is pivoted to the car or a fixture thereon, and the collector-frame having a pair of contact-brushes located, preferably, at right angles to its pivot-point, spring-supports for the collector-supporting frame, and actuating mechanism having spring-connections for the collector-frame; to a pivoted bar having a slot-iron, and a collector-frame pivoted to said bar to the rear of said slot-iron and spring-support for one end of said bar, and actuating mechanism having spring-connections for oscillating the collector-frame; to a collector-frame having at its lower end separate sides and ends inclosing conductors, which sides and ends are riveted together and to the collector to form a smooth narrow plate or iron for insertion into the conduit-slot, and to a collector having contact-brushes having an angular spring-pressure in the direction of their line of travel or that of the car.

Figure 1:
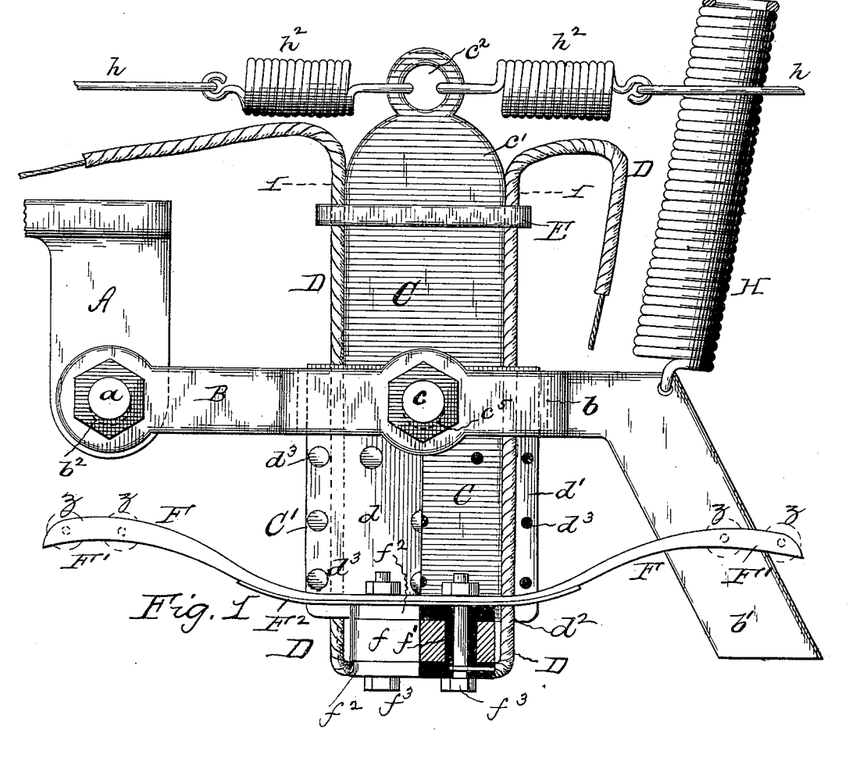
Figure 1 is an elevation, partly sectional, of a current-collector for a motor-car of an electric railway having line-conductors in a slotted conduit, the collector being shown detached from the car and conduit and also as having an arrangement of operating mechanism suitable for but one collector-frame for a car.
Figure 2:
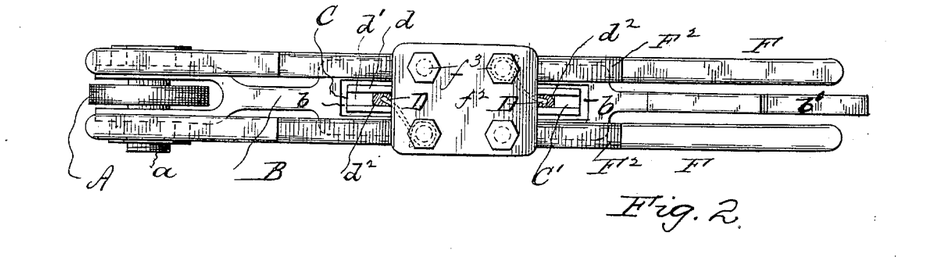
Fig. 2 is an inverted plan of the same.
Figure 4:
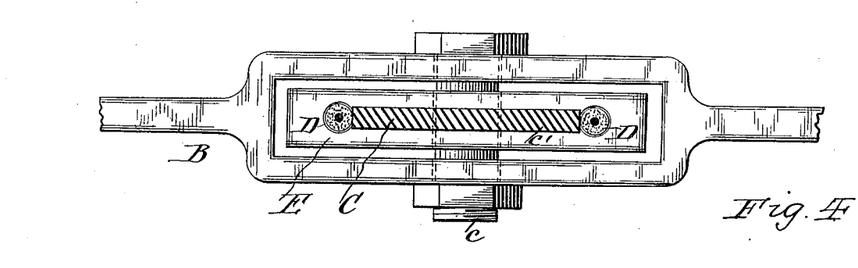
Fig. 4 is a section on line 1 1, Fig. 1, drawn to an enlarged scale.
Figure 5:
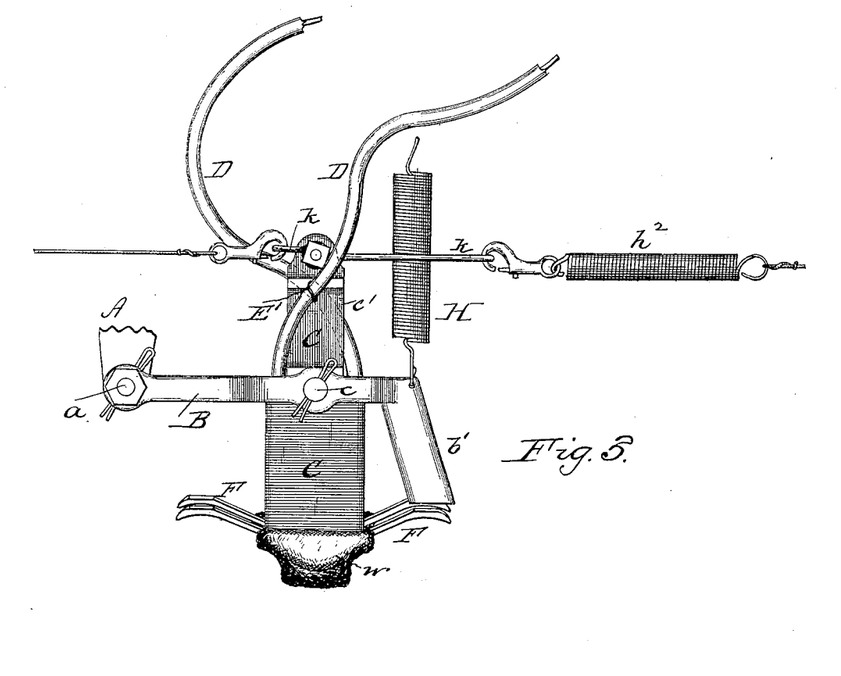
Fig. 5 is an elevation showing part of car, electric motor, conduit with conductors, two collector-frames for the car, and actuating mechanism therefor.
Figure 16:
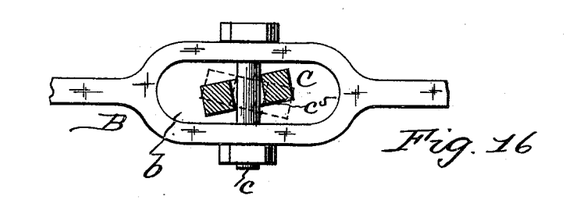
Fig. 16 is a horizontal section, partly in elevation, of same, showing lateral rocking motion of collector-frame.
Figure 17:
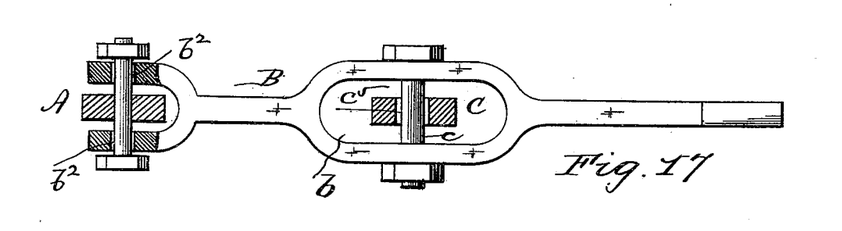
Fig. 17 is a plan of supporting-bar and collector-frame, partly in section, showing the pivotal connection for said bar and the opening in the latter for admitting of lateral and up-and-down motion.

In the drawings Fig. 1, A represents a bracket or hanger which is secured to the body of the car or a fixture thereon, as shown in Fig. 5. To hanger A is pivoted a bar, B, having an elongated slot, $b$, and downwardly-projecting or bent free end $b'$, which enters or depends into and travels along in the conduit-slot $s$, as shown in Fig. 5. Within slot $b$ of bar B is inserted the collector-frame C, which is loosely pivoted to bar B by means of a bolt, $c$, or equivalent device. The pivots for bar B and frame C may be of any desired construction, either pins or universal joints. The slot $b$ in bar B is wider than the thickness of the frame C, to provide spaces between the walls of said slot and the frame to admit of a lateral play or motion for frame C, as shown in Fig. 16. The frame C is located to the rear of the bent end $b'$ of frame or bar B, and the latter therefore serves to push aside or remove stones or other obstructions on the line of the conduit-slot in advance of the frame C, so as to prevent damage to the latter or the conductors thereon. The frame C is composed of a main plate, $c'$, having an eye, $c^2$, at its top, which plate has normally a vertical or perpendicular position, as shown.

To the lower end of the frame C are riveted side and end plates, $d$ $d'$, respectively, the end plates, $d'$, being of a width that a space, $d^2$, is provided between them and the edges of the plate or frame C for the passage of conductors D, which pass up alongside the edges of plate C, and near its top are suitably fastened in position to plate C, either by a clamping-ring, E, as shown in Fig. 1, or by wires E', as indicated in Fig. 3. The rivets $d^3$, for connecting the sides $d$ and ends $d'$ together and to plate C, are flush with the outside surfaces of sides $d$, so that the latter are preferably smooth for insertion into and travel along the conduit-slot $s$. The rivets $d^3$ firmly hold said parts together to protect the incased conductors D from damage and make the lower or slot-iron part C' of the plate or frame C strong and durable for wear in the conduit-slot. If desired, however, the end plates, $d'$, may be dispensed with.

To the bottom of frame C is secured right-angle or other plates or lateral lugs $f$, having bolt or screw openings lined with insulation $f'$, and upon the top and bottom of these lugs are plates or layers of insulation $f^2$. Upon the top plate $f^2$ on each side of frame C, and parallel therewith, are mounted contact-brushes F, which are located at right angles to the pivot or journal $c$ of frame C.

Figures 10, 11, 12, 13:
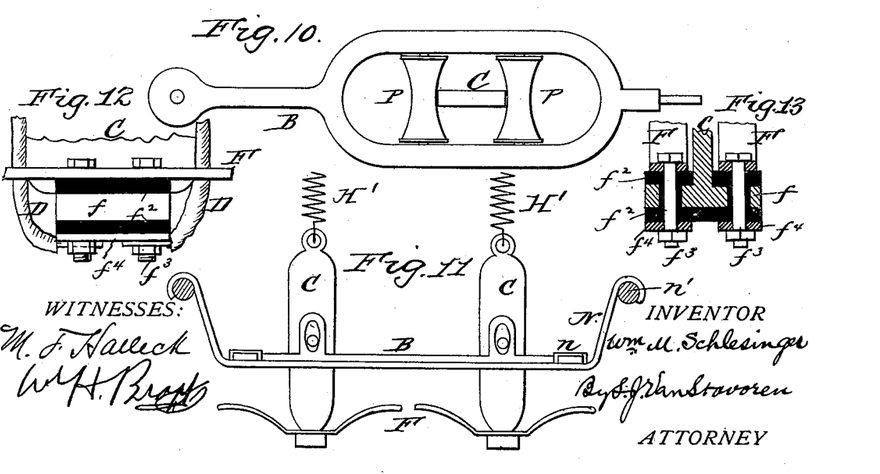
Fig. 10 is a plan of Fig. 8.
Fig. 11 is an elevation showing two or a duplication of the form of collector shown in Fig. 5.
Figs. 12 and 13 are respectively a longitudinal elevation and a cross-section of lower part of collector-frame, showing preferable connection of collector-conductors to collector-brushes.

The brushes F and plates of insulation $f^2$ are firmly secured to lugs $f$ or to frame C by bolts $f^3$, which pass through the insulation in the openings in said lugs, as shown more plainly in Fig. 1, and the ends of the conductors D are suitably secured to the bolts $f^3$, so that said conductors will not be in electrical contact with any part of the frame C, except with the brushes F F and the bolt $f^3$, with which it connects to form a circuit from each brush F, by way of a bolt, $f^3$, to the conductors D, and thence to the motor G, as illustrated in Fig. 5, one of the conductors D leading to one side or brush for the armature of the motor, and the remaining conductor D leading to the other side or brush for the armature, in the usual way. I prefer, however, to make the connection between brushes F and conductors D as shown in Figs. 12 and 13, wherein separate bottom metallic plates $f^4$, having the ends of the conductors soldered or otherwise secured thereto, are employed, so that if one of the screw-bolts $f^3$ for each brush is loosened and drops out the other bolt therefor maintains the electrical connection for the brush.

The contact-brushes F are preferably made of thick or heavy U-shaped or bowed steel plates to insure wear and durability, and they have curved ends F', which preferably contact on their upper sides with the conduit-conductors. The brush-plates F may be single plates or composed of one or more leaves or plates, to serve as re-enforcing plates or springs, in a manner similar to an elliptical carriage-spring, or as shown in Fig. 1, F² being the re-enforcing brush-plate to give greater support, firmness, and elasticity to the contact ends of the brushes. The latter may be provided with wheels or rollers for contact with the conduit-conductors, as indicated by dotted lines $z$ in Fig. 1, or the bowed ends of the brushes may themselves contact with the conduit-conductors, as above described; and as said ends are elastic they may be of any suitable configuration in cross-section, which configuration depends mainly upon the form of the conduit-conductors and their arrangement or location in the conduit.

To more thoroughly provide for insulating the lower part of the conductors D, as well as their connections with the bolts or screws $f^3$ or with the plates $f^4$, I prefer to wrap around or cement to the lower part of frame C layers of cloth, canvas, or analogous material, as indicated at $w$, Fig. 3.

Instead of securing the conductors D to frame C and to the brushes, as described, they may be otherwise secured to said parts, as desired.

Figures 14, 15:
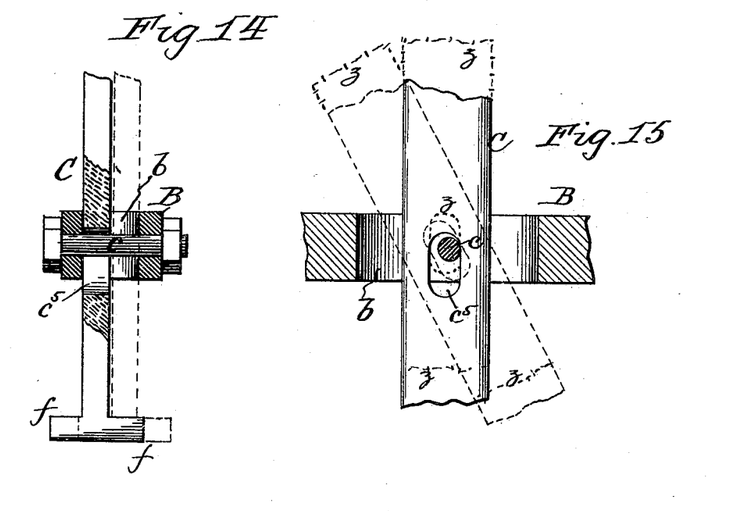
Fig. 14 is a transverse section of part of collector-frame and of its supporting-bar, showing laterally-sliding movement of said frame.
Fig. 15 is a longitudinal section, partly in elevation, of same, showing longitudinal rocking motion and vertical up-and-down motion of the collector-frame.

As the collector-frame C is loosely pivoted to bar B, and as the bar-slot $b$ is wider than the plate or frame C is thick, it not only has a longitudinal oscillation upon its pivot-bolt, as shown in Fig. 15, but also a lateral rocking movement, as indicated in Fig. 16, independently of bar B. To more freely admit of these movements, as well as to permit frame C to slide laterally upon its pivot point or bolt, and also have, as indicated by dotted lines $z'$ $z'$ in Fig. 15, a vertical up-and-down movement independently of bar B, I prefer to make the pivot-opening $c^3$ in frame C an elongated slot vertically arranged, as shown; or this opening may otherwise be made large enough to furnish the required play for frame C, in order that it may oscillate or rock longitudinally and laterally, slide laterally upon its pivot-point, and move up and down vertically independently of bar B. The pivot-bearing $b^2$ for bar B is likewise constructed, or has more or less loose play on pivot or journal $a$, to afford a more or less lateral movement of said bar, and as the latter supports frame C it is subject to and partakes of said lateral as well as other movements of the bar B. The frame C therefore has a slight up-and-down movement on bar B, and also both a lateral sliding movement and a lateral oscillation within the slot $b$ of bar B independent of the movement of the bar, and as the latter has a lateral movement and also an up-and-down movement on its pivotal support $a$, which movements, when made, are also imparted to the frame C, its adjustments, therefore, are such that it always normally assumes and always retains a vertical or perpendicular position under all conditions of service and of movement of bar B to maintain contact between brushes F and the conduit-conductors.

As the bar B is pivoted to the car or a fixture thereon, it and the frame C have an initial adjustment within the limit of motion of bar B, to bring the collector-brushes in contact with the conduit-conductors irrespective of the variation of the height of the car-body from the conduit. To maintain such described adjustment for bar B and frame C, and also to provide for preserving the contact between the brushes F and the conduit-conductors under varying conditions of service and travel, the end $b'$ of the bar B has a spring or yielding support H, the upper end of which is attached to the car-body or a fixture thereon, as shown in Fig. 5.

As the bar B is pivotally supported at one end and has the yielding or spring support H at the other end, an adjustable support for the frame C and its brushes F is provided, the elastic pressure of which, if alone depended upon, maintains contact between the brushes and the conduit-conductors under varying conditions of service and without producing undue bearing or contact-pressure between the brushes F and the conduit-conductors, for the reason that the pressure of spring H is not directly exerted upon frame C and its contact-brushes, and more especially so as the ends of the brushes F are themselves elastic or composed of spring-plates and yield independently of the yielding support H of bar B to the inequalities of the conduit and of the conductors therein. As the contact-surfaces of the conduit-conductors, as well as those of the brushes, are not subjected to undue contact-pressure, there is less wear of the brushes and conduit-conductor contact-surfaces and they are more durable. To the eye $c^2$ of frame C or to any other preferred part of the frame C are attached chains, bars, or other devices $h$, which lead to and connect with preferably a double or two-ended pivoted lever, $h'$, suitably placed on the car as desired; but for the sake of clearness in the drawings I have shown the lever $h'$ arranged lengthwise of the car.

To provide a flexible or yielding connection between lever $h'$ and the collector-frame C, so that the latter is free to yield to the varying conditions of service independently of bar or support B, I prefer to insert spiral springs $h^2$ or other equivalent devices between the lever $h'$ and the collector C, or to make such springs a part of the ropes or chains $h$. These springs may be connected to the eye $c^2$, as shown in Figs. 1 and 5, or to coupling-links $k$, attached to the eye $c^2$, as indicated in Fig. 3, or they may be located as illustrated by dotted lines $k'$ in Fig. 5, or otherwise suitably disposed of as desired.

When a single current-collector frame C is used for a car, the springs $h^2$ and chains $h$ are connected to the frame C, as shown in Fig. 1— that is, each side of the frame C has a separate spring-connection $h^2$; but when more than one frame C is used they are coupled together, preferably as shown in Fig. 5, or each frame C has but one spring, $h^2$, so that a movement of the lever $h'$ in one direction oscillates the frame or frames C to cause only one pair of ends F' of brushes F to contact with the conduit-conductors, if desirable, as indicated by dotted lines $v$, Fig. 5, while a reverse movement of said lever oscillates frames C in a contrary direction to bring the opposite pair of ends F' of its brushes in contact with the conduit-conductors. The frames C are thus actuated to bring a pair of ends, F', of brushes F in contact with the conduit-conductors, which ends are the following ends or those to the rear relatively to the direction of travel of the car, so that by so actuating the brushes the direction of travel of the car may be reversed without danger of damaging or impairing the contact-brushes of the collector-frame; but if the ends F' of the brushes are curved sharply or have rollers $z$, both pairs of ends of the brushes F may always be in contact with the conduit-conductors.

The springs or elastic media $h^2$ between the frames C and the lever $h'$, whether used to oscillate the frames C or otherwise, provide a spring-pressure for the collector-frame C and its brushes, the direction of which corresponds to that of the travel of the brushes or that of the car, and as the spring H for bar B has an upward pressure, the resultant of these two spring-pressures or force is an angular pressure for the brushes approximating the direction of travel of the brushes for maintaining their contact with the conduit-conductors, and as this angular pressure only falls indirectly upon the brushes F, they are maintained in contact under all varying conditions of travel without exerting undue contact-pressure between them and the conduit-conductors, as is the case where the brushes are subjected to a direct upward pressure.

To facilitate movement of collector-frames C, or to obtain a direct pull thereon by the lever $h'$, the ropes or chains $h$ have guide or idler pulleys $m$, suitably mounted in brackets $m'$, secured to the motor-casing, as indicated in full lines, Fig. 5, or to the car-body, as illustrated by dotted lines $m^2$ in said figure.

If desired, suitable spring-catches, $h^4$, are provided for holding lever $h'$ in its adjusted position, as shown in Fig. 5.

From the foregoing it will be noted that the collector-frame C and its supporting-bar B have a vertical adjustment on the pivot-point $a$ for bar B to give an initial adjustment for brushes F for contact with the conduit-conductors; that said bar has a spring or elastic support, H, to provide for the bar B yielding to the varying height of the car from the conduit due to variation in the load on the car and to the inequalities in construction of roadway and of the conduit, whereby the position of frame C, and consequently the contact of its brushes F with the conduit, is not disturbed, but varies with such described conditions of service that the bar B has a lateral movement to accommodate its end $b'$ to inequalities or curves in the conduit-slot; that the collector-frame C has a vertical movement, a lateral and a longitudinal rocking motion, and a lateral sliding movement independent of the movements of bar B, whereby the collector-frame C and its brushes F adjust themselves to any inequalities or curves in the conduit slot and other variations in the condition of service independetly of the bar B; that the collector-frame and brushes have a yielding connection with a lever or actuating mechanism, whereby the frame and brushes are oscillated, if desired, to make one or the other end of the brushes contact with the conduit-conductor to admit of traveling more safely backwardly and forwardly without damaging or breaking the ends of the brushes, and to provide a spring-pressure in the direction of the length of travel of the brushes, which, acting alone or in conjunction with the spring-support H for bar B, results in an angular pressure in the direction of travel of the brushes for preventing undue contact-pressure between the brushes and conduit-conductors and reducing the wear and tear on said parts.

As it is obvious that these described beneficial results may be obtained by varied constructions of bar B and collector-frames C, I do not confine myself to any one particular construction; hence in Figs. 6 to 11, inclusive, I have shown modified forms of bars B and frames C for securing said described results. Thus in Figs. 6 and 7 the frame C is pivoted in vertical elongated slots on bars B, which have a lateral movement in guides $n$ on secondary bars N, suitably mounted on cross-bars $n'$, secured to the cars, or these bars may be the car-axles. The frame C in this case has the spring-support H', and there may be one or more than one frame C on bars B, as illustrated in Fig. 11.

Figures 6, 7, 8, 9:
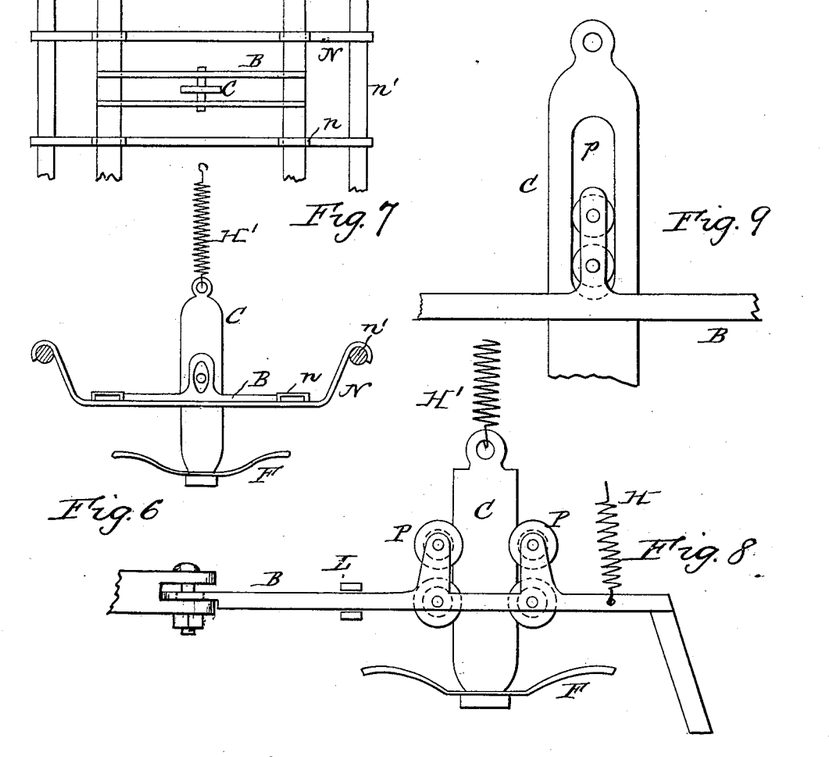
Fig. 6 is an elevation of a modified construction of collector.
Fig. 7 is a plan of same.
Fig. 8 is an elevation of another modification of collector.
Fig. 9 is an elevation of a modification of the form shown in Fig. 8.

In Figs. 8 and 10 the frame C has a spring-support, H', as shown plainly in Fig. 8, to admit of its vertical movements, and is located between parallel elongated groove guide-rollers P on bar B, there being a slight play between the edges of frame C and the peripheries of the rollers, as indicated in Fig. 10, to admit of the lateral and longitudinal oscillations and movements of said frame. In this case bar B may have a vertically-located pivot, as illustrated in Fig. 8, and more or less play between the pivot and the pivot-opening in said bar, and, if desired, guides L may be provided for supporting-bar B; but these are not essential when spring H is employed to support the outer end of said bar, as above set forth.

In Fig. 9 the frame C is shown provided with a vertically-located elongated slot for the reception of the rollers on bar B.

In some cases the springs $h^2$ and connections $h'$ may be dispensed with, in which case collector C is mounted upon the car and carried along by it, the spring-support H then holding the brushes in contact with the conduit-conductors, or it may be actuated as desired.

What I claim is—

1. In an electric railway, the combination, with a car, of a bar or support and a current-collector frame mounted upon said support and having a longitudinal and a lateral rocking motion, a lateral sliding motion, and a vertical movement independently of said support, substantially as and for the purpose set forth.

2. An electric-railway car having a traveling current-collector composed of a supporting-frame having a lateral and a vertical movement, and a collector or brush frame mounted on said supporting-frame, and having vertical and lateral and longitudinal oscillating movements independent of the movement of the supporting-frame, substantially as set forth.

3. In an electric railway, a car having a traveling current-collector composed of a supporting-frame pivoted at one end and having a spring-support at its other end, and a brush-frame mounted upon and having a lateral movement independent of the supporting-frame, substantially as set forth.

4. In an electric railway, a car having a traveling current-collector composed of a pivoted bar or frame, B, a brush-frame pivoted to bar B, a spring-support for said bar, and devices on the car for manually actuating said brush-frame to vary the contact of its brushes or shoes, substantially as set forth.

5. A traveling current-collector composed of a pivoted frame having a yielding support and a brush-frame loosely mounted upon said pivoted frame and having upward spring-pressure contact-brushes, substantially as set forth.

6. An electric-motor car having a traveling current-collector composed of a frame pivoted at one end to the car and having an opposite free end, an elastic or spring support for said free end, and a brush-frame loosely mounted on said pivoted frame and having oscillating, lateral sliding, and vertical movements independently of said pivoted frame, substantially as set forth.

7. A traveling current-collector composed of a bar loosely pivoted at one end and having an opposite free bent end provided with a spring-support, H, a brush-frame pivoted to said bar, and upward spring-pressure contacts or brushes on the brush-frame, substantially as set forth.

8. A traveling current-collector composed of pivoted bar B, having bent end $b'$ and spring H, and a brush-frame, C, pivoted to bar B, substantially as set forth.

9. A traveling current-collector composed of a bar, B, having an up-and-down and a lateral movement, and a brush-frame pivoted to bar B and having a lateral movement independent of bar B, substantially as set forth.

10. In an electric-railway car having a traveling current-collector composed of a pivoted bar having bent end $b'$ and spring H, a brush-frame, C, mounted on bar B, and actuating mechanism for frame C, substantially as set forth.

11. In an electric railway, a car having a current-collector freely supported upon the car, springs $h^2$ and connections $h$, attached to the current-collector, and operating devices for connections $h$, substantially as and for the purpose set forth.

12. In an electric railway, a car having a freely-supported current-collector provided with parallel upward spring-pressure brushes and actuating devices for tilting the current-collector, substantially as and for the purpose set forth.

13. A traveling current-collector composed of a bar or frame, B, having elastic or spring support H, a brush-frame, C, mounted on frame B, and having springs $h^2$ and connections $h$ to provide an angular pressure for the brushes in the direction of their travel, as and for the purpose set forth.

14. An electric-motor car having a current-collector composed of a pivoted bar, B, having spring-support H, a brush-frame, C, pivoted or mounted on bar B, and having springs $h^2$, connection $h$, and lever $h'$, as and for the purpose set forth.

15. A traveling contact composed of a pivoted or oscillating brush-frame having a pair of parallel brushes, and actuating mechanism provided with flexible or spring-pressure connections for moving opposite ends of the brushes into and out of contact, substantially as set forth.

16. The combination of pivoted bar B, having slot $b$ and bent end $b'$, the frame C, pivoted to frame B within slot $b$, and having at its lower end contact-brushes F F, substantially as set forth.

17. A traveling current-collector frame, C, having side and end plates, $d$ $d'$, incasing-conductors D D, and bottom side lugs, $f$ $f$, and parallel insulated spring-brushes F F, secured to said lugs and in circuit with said conductors, substantially as set forth.

18. A traveling current-collector frame, C, having side and end plates, $d$ $d'$, incasing-conductors D, lugs $f$, contact-brushes F, and fastening-bolts $f^3$, and insulation between said lugs, brushes, and bolts, substantially as set forth.

19. The combination, with an electrically-propelled car, a traveling current-collector composed of a pivoted bar, B, having a spring-support, H, and a brush-frame, C, mounted upon bar B and having bow-shaped upward spring-pressure brushes F, provided with re-enforcing leaves or bars $F^2$, substantially as set forth.

20. A traveling current-collector having bow-shaped upward spring-pressure brushes F upon opposite sides of the collector, and each brush having a re-enforcing spring-plate, $F^2$, having frictional contact and a simultaneous action with the brush, substantially as set forth.

21. A traveling current-collector having parallel brushes F, in combination with plates $f^4$, bolts $f^3$, conductors D, and insulation $f^2$, substantially as set forth.

22. In an electric railway, a slotted conduit having electric conductors, in combination with a motor-car having a freely-supported traveling current-collector composed of a pivoted bar having a finger depending into the conduit-slot, and a spring, H, and a brush-frame mounted upon and having movements independently of said pivoted bar and depending into the conduit-slot to the rear of said finger, substantially as set forth.

23. An electric-motor car having two traveling current-collectors, in combination with lever $h'$ and connections $h$, having springs $h^2$, substantially as set forth.

24. A traveling current-collector having parallel brushes F, pivoted to a bar, B, having spring H, in combination with springs $h^2$ and connections $h$, secured to said collector, substantially as and for the purpose set forth.

25. The combination of pivoted bar B, having spring H, and brush-frame C, pivoted to bar B, and having springs $h^2$, actuating-connections $h\ h$, and a pair of parallel brushes on frame C, substantially as set forth.

26. A traveling current-collector composed of a pivoted bar, a brush-frame loosely mounted upon said bar, in combination with springs $h^2$ and connections $h$, secured to the brush-frame, and an actuating-lever for said connections $h$, substantially as set forth.

27. A traveling current-collector for electric-railway cars, composed of a central plate, C, provided with separate side plates, $d$, and integral side lugs, $f$, said side plates being secured to plate C and inclosing conductors D, and insulated brushes F, secured to lugs $f$ and in circuit with said conductors, substantially as set forth.

In testimony whereof I affix my signature in presence of two witnesses.

WILLIAM M. SCHLESINGER.

Witnesses:
CHAS. F. VAN HORN,
S. J. VAN STAVOREN.